United States Patent
Tsutsui et al.

(10) Patent No.: US 8,863,876 B2
(45) Date of Patent: Oct. 21, 2014

(54) INTAKE STRUCTURE FOR SADDLE TYPE VEHICLE

(71) Applicant: Honda Motor Co., Ltd., Tokyo (JP)

(72) Inventors: Noriyoshi Tsutsui, Wako (JP); Takuma Koishikawa, Wako (JP); Shin Yokoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/946,016

(22) Filed: Jul. 19, 2013

(65) Prior Publication Data

US 2014/0060473 A1 Mar. 6, 2014

(30) Foreign Application Priority Data

Aug. 31, 2012 (JP) ................. 2012-192488

(51) Int. Cl.
| | | |
|---|---|---|
| *B60K 13/02* | (2006.01) | |
| *B62K 11/04* | (2006.01) | |
| *B62J 17/00* | (2006.01) | |
| *F02M 35/10* | (2006.01) | |

(52) U.S. Cl.
CPC ............... *F02M 35/10* (2013.01); *B62K 11/04* (2013.01); *B62J 17/00* (2013.01)
USPC ....................................................... 180/68.3

(58) Field of Classification Search
USPC ....................................................... 180/68.3
See application file for complete search history.

(56) References Cited

U.S. PATENT DOCUMENTS

| | | | | |
|---|---|---|---|---|
| 4,648,474 | A | * | 3/1987 | Shinozaki et al. ............ 180/219 |
| 6,105,701 | A | * | 8/2000 | Buell ............................ 180/229 |
| 6,251,151 | B1 | * | 6/2001 | Kobayashi et al. ............. 55/309 |
| 2005/0217633 | A1 | * | 10/2005 | Uneta et al. ............... 123/198 E |
| 2008/0190683 | A1 | * | 8/2008 | Hoeve ........................... 180/229 |
| 2008/0289893 | A1 | * | 11/2008 | Iwanaga ....................... 180/229 |

FOREIGN PATENT DOCUMENTS

| | | |
|---|---|---|
| EP | 0 441 461 A2 | 8/1991 |
| JP | 2005-104313 A | 4/2005 |
| JP | 2009-190642 A | 8/2009 |

* cited by examiner

*Primary Examiner* — John Walters
*Assistant Examiner* — James Triggs
(74) *Attorney, Agent, or Firm* — Birch, Stewart, Kolasch & Birch, LLP

(57) ABSTRACT

An intake structure for a saddle type vehicle for effectively lower the temperature of suction air includes an intake system disposed behind an engine supported on a vehicle body frame and a vehicle body cover for covering at least a side of the intake system. An inlet that is open to a side of a vehicle body on the inner side of the vehicle body cover is provided in the intake system. Further, a negative pressure formation section is provided at a position of the vehicle body cover at a substantially equal height to that of the inlet and on the rear side of the vehicle. The negative pressure formation section is configured from a depressed portion at which a vehicle body cover surface is depressed to the inner side of the vehicle body and an opening positioned in the depressed portion.

20 Claims, 8 Drawing Sheets

INTAKE STRUCTURE FOR SADDLE TYPE VEHICLE

CROSS-REFERENCE TO RELATED APPLICATIONS

The present application claims priority under 35 USC 119 to Japanese Patent Application No. 2012-192488 filed Aug. 31, 2012 the entire contents of which are hereby incorporated by reference.

BACKGROUND OF THE INVENTION

1. Field of the Invention

The present invention relates to an intake structure for a saddle type vehicle, and particularly to an intake structure for a saddle type vehicle which includes a vehicle body cover.

2. Description of Background Art

Conventionally, a structure of a saddle type vehicle wherein the sides of a vehicle body, the sides of an upper portion of an engine and so forth are covered with a vehicle body cover is disclosed, for example, in Japanese Patent Laid-Open No. 2005-104313. In Japanese Patent Laid-Open No. 2005-104313, a structure is disclosed that has a ventilation hole which makes it easy to allow heat of the engine confined in a space inside a side cover to escape therethrough.

By the structure disclosed in Japanese Patent Laid-Open No. 2005-104313 that has the ventilation hole, confined heat of the engine can be reduced to some degree. However, in order to lower the temperature of air to be supplied to an intake apparatus in order to raise the engine output power, only to provide a ventilation hole as disclosed in Japanese Patent Laid-Open No. 2005-104313 is insufficient to lower the temperature of suction air. Thus, a structure that can effectively lower the temperature of suction air is demanded.

SUMMARY AND OBJECTS OF THE INVENTION

According to an embodiment of the present invention, it is an object to provide an intake structure for a saddle type vehicle that can effectively lower the temperature of suction air.

In order to attain the object described above, according to an embodiment of the invention, an intake structure for a saddle type vehicle includes an intake system disposed behind an engine supported on a vehicle body frame and a vehicle body cover for covering at least a side of the intake system wherein an inlet that is open to a side of a vehicle body on the inner side of the vehicle body cover is provided in the intake system, and a negative pressure formation section configured from a depressed portion at which a vehicle body cover surface is depressed to the inner side of the vehicle body and an opening positioned in the depressed portion is provided at a position of the vehicle body cover at a substantially equal height to that of the inlet and on the rear side of the vehicle.

According to an embodiment of the present invention, the intake structure for a saddle type vehicle is configured such that the negative pressure formation section is disposed on the lower side of a rear portion of a rider's seat of a seat.

According to an embodiment of the present invention, the intake structure for a saddle type vehicle is configured such that upper and lower side wall portions of the depressed portion are formed so as to extend substantially along a forward and rearward direction of the vehicle.

According to an embodiment of the present invention, the intake structure for a saddle type vehicle is configured such that the opening is formed like a slit which is inclined in a forward and rearward direction of the vehicle body.

According to an embodiment of the present invention, the intake structure for a saddle type vehicle is configured such that the opening is provided in a depressed portion forward side wall on the front side of the vehicle with respect to the depressed portion.

According to an embodiment of the present invention, the intake structure for a saddle type vehicle is configured such that the opening is provided over a substantially overall width of the depressed portion in a heightwise direction of the vehicle.

According to an embodiment of the present invention, the intake structure for a saddle type vehicle is configured such that a depressed portion bottom face of the depressed portion is formed in a moderate streamline-shaped curved line which continues to a depressed portion outer side portion outside the depressed portion toward the rear of the vehicle.

According to an embodiment of the present invention, the intake structure for a saddle type vehicle is configured such that an opening upper outer wall face positioned on the upper side of the opening is provided on the vehicle body cover in such a manner so as to project to the outer side in the vehicle widthwise direction through the opening.

According to an embodiment of the present invention, the intake structure for a saddle type vehicle is configured such that an intake air guide portion that projects to the inner side of the vehicle body on the front side of the vehicle with respect to the inlet and guides an in-cover air flow on the inner side of the vehicle body cover to the inlet side is provided on the vehicle body cover.

According to an embodiment of the present invention, the intake structure for a saddle type vehicle is configured such that the opening, inlet and intake air guide portion are disposed at a substantially equal height in an upward and downward direction of the vehicle.

According to an embodiment of the present invention, the intake structure for a saddle type vehicle is configured such that a fender is provided on the inner side of the opening in the widthwise direction of the vehicle.

According to an embodiment of the present invention, the negative pressure formation section having the depressed portion at which the vehicle body cover surface is depressed to the inner side of the vehicle body and the opening positioned in the depressed portion is provided at the position of the vehicle body cover at a substantially equal height to that of the inlet and on the rear side of the vehicle. Therefore, upon operation of the vehicle, a negative pressure is formed in the depressed portion of the negative pressure formation section by an air flow which passes a side of the vehicle, and a suction flow which sucks up air in the inside of the vehicle body cover through the opening is generated. Therefore, the air in the proximity of the inlet can be fluidized compulsorily. Accordingly, as the air to be sucked into the inlet, air of a comparatively low temperature other than air warmed by the engine can be sucked. Consequently, the engine output power can be improved.

According to an embodiment of the present invention, the negative pressure formation section is disposed on the lower side of the rear portion of the rider's seat of the seat. Consequently, the negative pressure formation section is disposed at a position spaced from the positions at which the legs of the occupant are placed. Therefore, current of an air flow which passes the vehicle body cover surface can be prevented from being obstructed by the legs of the occupant. Accordingly, generation of a negative pressure by the air flow can be ensured to assure the suction action of the air through the opening. Also it is possible to prevent suction air of a high temperature from hitting on the legs of the rider.

According to an embodiment of the present invention, the upper and lower side wall portions of the depressed portion are formed so as to extend substantially along the forward and rearward direction of the vehicle. Therefore, an air flow which flows in the depressed portion can be guided by the upper and lower side wall portions so as to flow along an air flow, and a smooth air flow can be produced and the suction action of air from the opening can be ensured.

According to an embodiment of the present invention, since the opening is formed like a slit, it is difficult for the admission of a foreign article through the opening into the inside of the vehicle body cover.

According to an embodiment of the present invention, the opening is provided in the depressed portion forward side wall of the depressed portion. Therefore, the direction of the opening can be set to the vehicle rear direction. Consequently, an air flow by the suction from the opening can be directed so as to flow along an air flow readily. Thus, effective suction can be achieved. Further, since the opening is provided in the depressed portion forward side wall, the opening width of the opening in the forward and backward direction as viewed from a lateral direction of the vehicle body can be made small.

According to an embodiment of the present invention, since the opening is provided over the substantially overall width of the depressed portion in the heightwise direction of the vehicle, the length of the depressed portion in the widthwise direction can be utilized over a substantially overall range thereof to the most as a negative pressure formation width. Consequently, effective suction can be carried out.

According to an embodiment of the present invention, the depressed portion bottom face of the depressed portion is formed in a moderate streamline-shaped curved line which continues to the depressed portion outer side portion outside the depressed portion toward the rear of the vehicle body. Therefore, from current of an air flow from within the depressed portion to the rear of the vehicle, a smooth air flow can be produced along an air flow without being disturbed by the same. Consequently, the suction action of air through the opening can be ensured.

According to an embodiment of the present invention, since, in the vehicle body cover, the opening upper outer wall face positioned on the upper side of the opening projects to the outer side in the vehicle widthwise direction through the opening, invasion of rainwater and so forth through the opening can be prevented.

According to an embodiment of the present invention, the intake air guide portion which projects to the inner side of the vehicle body on the front side of the vehicle with respect to the inlet and guides an in-cover air flow on the inner side of the vehicle body cover to the inlet side is provided on the vehicle body cover so that air can be supplied compulsorily to the inlet. Therefore, air from the front of the vehicle having a comparatively low temperature other than air warmed by the engine can be supplied by a greater amount to the inlet.

According to an embodiment of the present invention, the opening, inlet and intake air guide portion are disposed at a substantially equal height in the upward and downward direction of the vehicle. Consequently, a guiding action of the air feeding side to the inlet by the intake guide portion and a guiding action of the air sucking side in the proximity of the inlet through the opening can be made effectively act along a flow of air by an air flow. Therefore, the air in the proximity of the inlet is normally fluidized compulsorily, and air other than air warmed by the engine can be supplied by a greater amount to the inlet.

According to an embodiment of the present invention, since the fender is provided on the inner side of the opening in the widthwise direction of the vehicle, invasion of water, a foreign article or the like through the opening into the inside of the vehicle body can be prevented by the fender.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3(a) is a plan view of a right side rear cover in an attached state to the vehicle and FIG. 3(b) is a side elevational view of the right side rear cover in the attached state to the vehicle;

FIG. 6(a) is a plan view of a right side cover in an attached state to the vehicle and FIG. 6(b) is a side elevational view of the right side cover in the attached state to the vehicle;

DETAILED DESCRIPTION OF THE PREFERRED EMBODIMENTS

In the following, an embodiment of the present invention is described.

First, a motorcycle according to the embodiment of the present invention is described in detail with reference to FIGS. 1 to 8.

It is to be noted that the drawings should be viewed in the direction of reference symbols, and in the figures, directions with reference to an operational direction of the motorcycle are indicated. In particular, as representations of the directions, Fr denotes a forward direction, Rr a rearward direction, Up an upward direction and Dw a downward direction.

Figure 1:
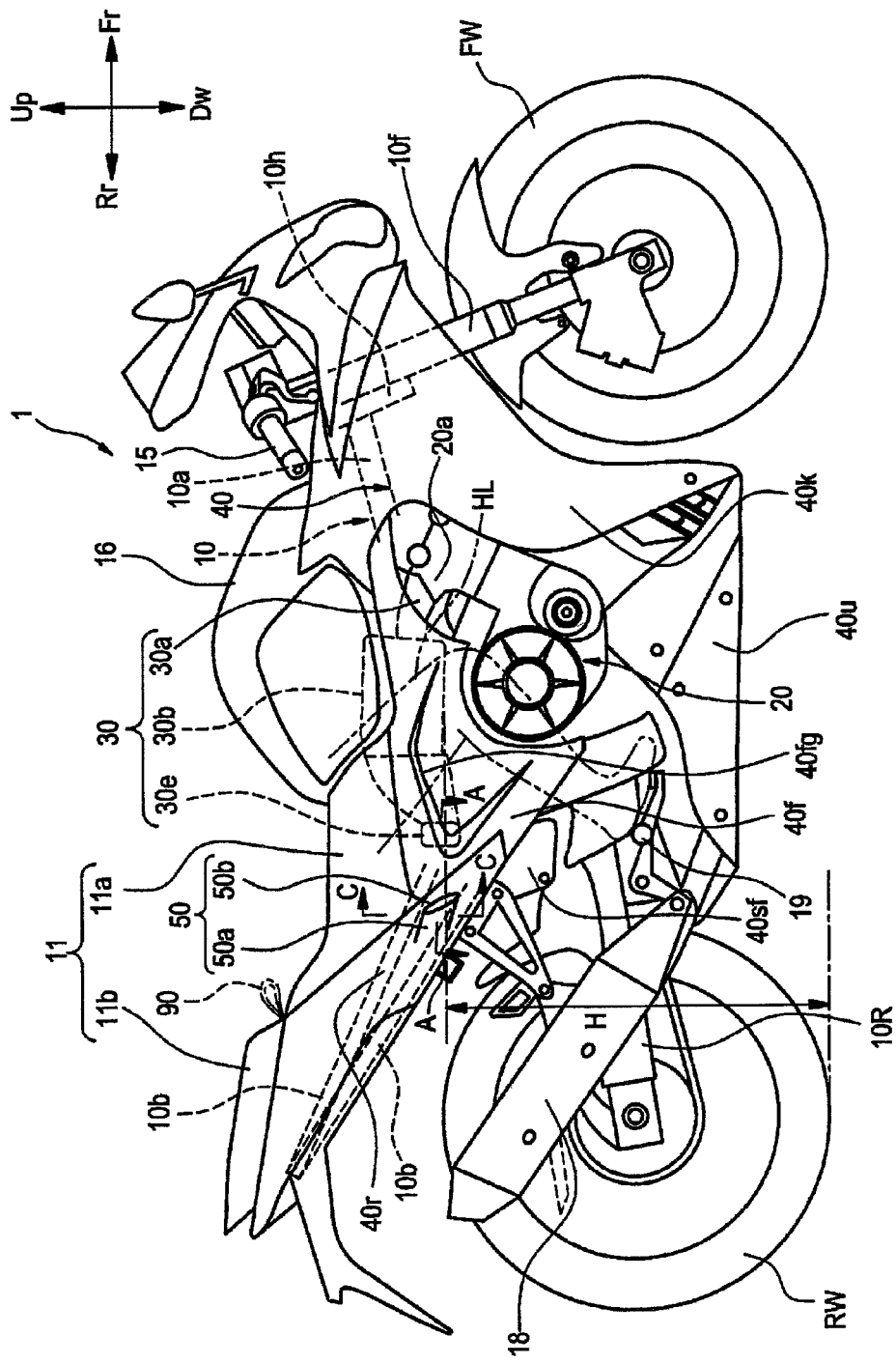
FIG. 1 is a right side elevational view of a motorcycle according to an embodiment of the present invention.

FIG. 1 is a side elevational view of a motorcycle 1 according to the present embodiment.

The motorcycle 1 is configured such that a vehicle body frame 10 serves as a skeleton to which component parts are attached. The vehicle body frame 10 has a head pipe 10h provided at a front end portion of the vehicle, and includes a pair of main frames 10a divergent to the left and the right from the head pipe 10h and extending rearwardly while being inclined rearwardly downwardly. An engine 20 is held on the lower side of the main frames 10a. A front fork 10f that supports a front wheel FW thereon is supported for steering movement on the head pipe 10h, and a steering handlebar 15 is connected to an upper portion of the front fork 10f.

A rear fork 10R that supports a rear wheel RW thereon is supported for upward and downward sliding movement on the vehicle body frame 10 and is suitably suspended on the main frames 10a through a suspension system.

A fuel tank 16 is provided at an upper portion of the main frames 10a of the vehicle body frame 10. A seat 11 including a passenger's seat 11b and a rider's seat 11a is provided at a rear portion of the vehicle body frame 10. It is to be noted that, at a vehicle rear portion of the vehicle body frame 10, a pair of left and right seat rails 10b are provided and extend obliquely upwardly from a rear end portion of the main frames 10a toward the rear of the vehicle. The seat 11 and so forth are held on the seat rails 10b.

An intake system 30 is disposed on the lower side of the fuel tank 16 and the rider's seat 11a on the upper side of the engine 20. The intake system 30 has a throttle body 30a and an air cleaner case 30b as well as an inlet 30e that extends rearwardly of the vehicle from the air cleaner case 30b and is open to the right side of the vehicle (on this side in FIG. 1). It is to be noted that an exhaust pipe extending forwardly from an upper front portion of the engine 20 is connected to a muffler 18 that passes below the engine 20 and extends rearwardly of the vehicle.

Figure 2:
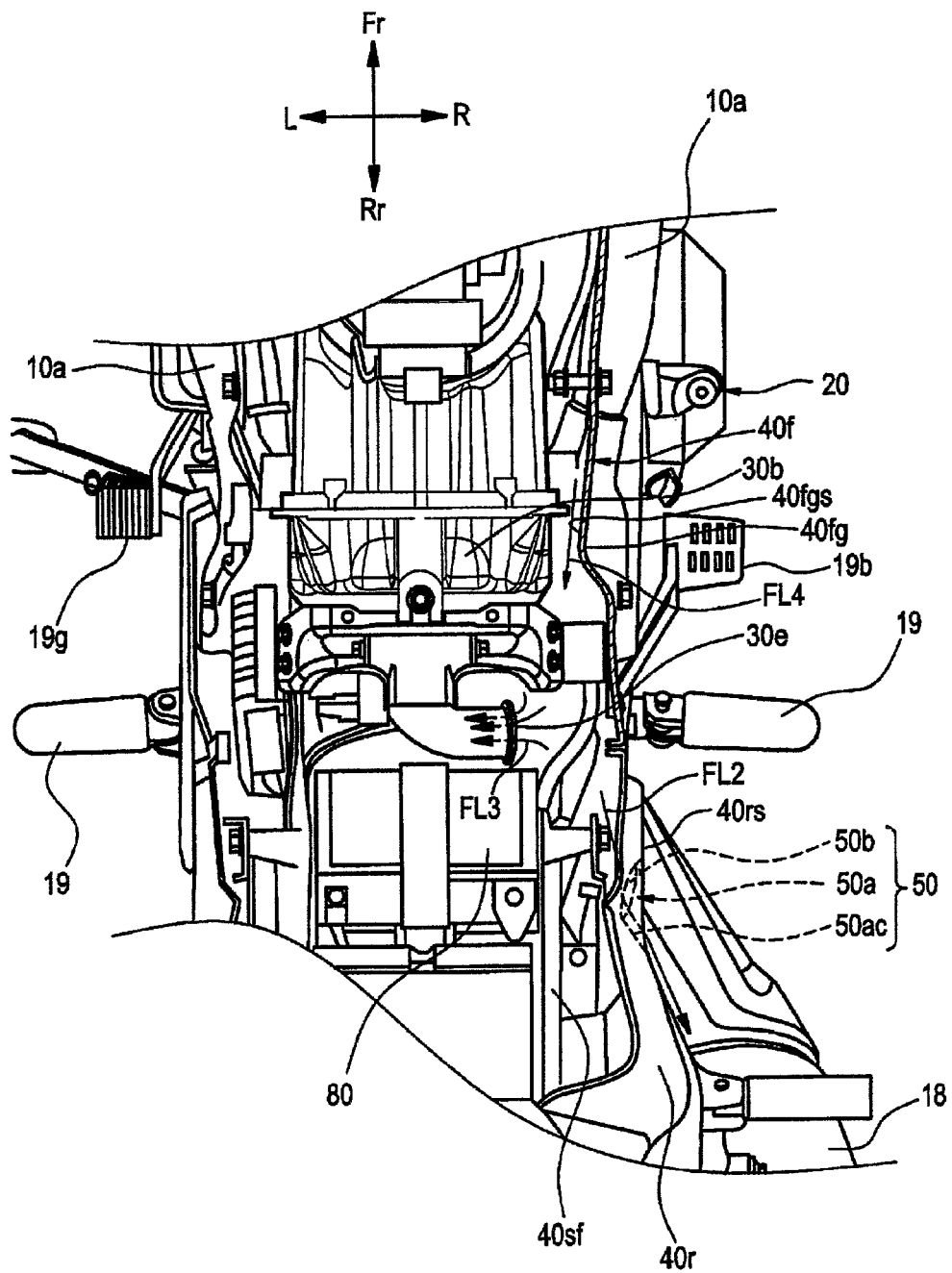
FIG. 2 is a partial schematic plan view of the motorcycle shown in FIG. 1 as viewed from above with a fuel tank and a seat removed.

In the intake system 30 of the present embodiment, the air cleaner case 30b is provided behind the throttle body 30a connected to an intake port 20a positioned on the upper rear side of the engine 20. A filter element (not shown) is provided in the inside of the air cleaner case 30b with a clean air chamber on the downstream side of an air flow with respect to the filter element (on the vehicle front side) being connected to the throttle body 30a. In addition, the inlet 30e is disposed on the upstream side of the air flow with respect to the filter element (on the vehicle rear side). The inlet 30e has a pipe structure that extends rearwardly from the center of the vehicle and is bent to the right and open to the right side of the vehicle as shown in FIG. 2.

It is to be noted that an injector for injecting fuel and a rockable throttle valve for adjusting the intake air amount are provided on the throttle body 30a. Air taken in through the inlet 30e is mixed with fuel in the throttle body 30a and supplied as air fuel mixture gas to the intake port 20a.

Further, the motorcycle 1 in the present embodiment is suitably covered on the outer side thereof with a vehicle body cover 40. In particular, the vehicle body cover 40 is configured such that it includes a front cover 40k for covering the front side and the front side face sides of the vehicle, and a side cover 40f that covers a region from the upper side face sides of the engine 20 to the lower side of the rider's seat 11a. The vehicle body cover 40 further includes a bottom cover 40u that covers the lower side of the engine 20, a rear cover 40r that covers from the rear side of the side cover 40f to the lower side of the passenger's seat 11b, and so forth. The vehicle body cover 40 is configured so as to suitably cover mechanical components and electric components of the vehicle. It is to be noted that the vehicle body cover 40 is configured such that it covers, on the opposite left and right sides of the vehicle, the vehicle body in a substantially symmetrical shape except portions hereinafter described.

Figures 3A, 3B:
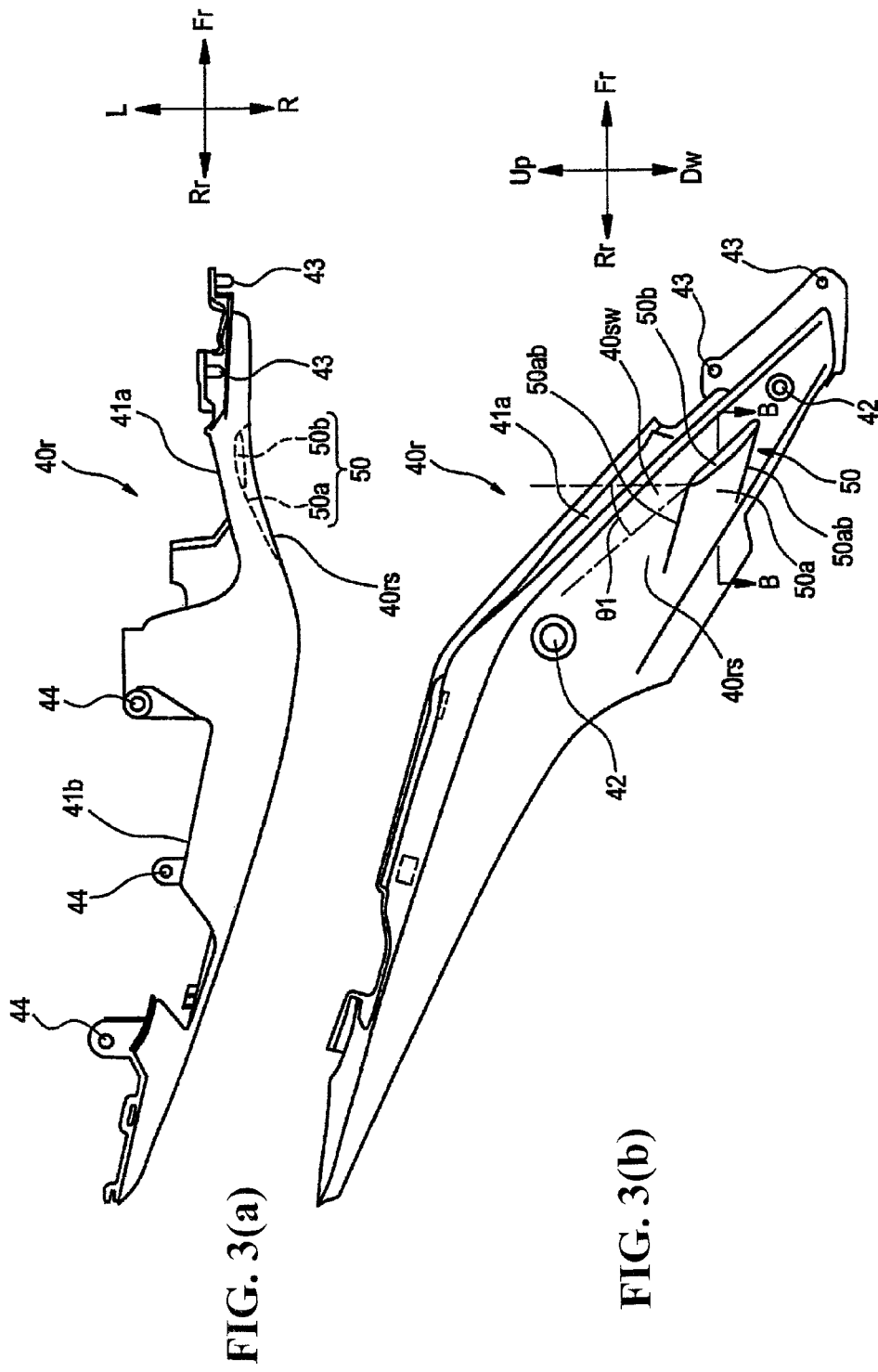
FIGS. 3(a) and 3(b) are a plan view and a side elevational view showing a rear cover of the motorcycle shown in FIG. 1. More particularly.

While such side covers 40f and rear covers 40r as described above are provided in a pair on the left and the right, the rear covers 40r are suitably fixed to the vehicle body frame 10 by a plurality of attaching portions 42 on the sides of the vehicle, a plurality of attaching portions 44 in the vehicle upward and downward direction and so forth as shown in FIG. 3. Further, each of the rear covers 40r has a front edge portion 41a that projects into the inside of the side cover 40f such that a boss 43 on the front lower end side thereof is engaged with an engaging portion 45a (refer to FIG. 6) at a rear portion of the side cover 40f so that the rear cover 40r is attached so as not to form a gap between the side cover 40f and a connection portion 40t (refer to FIG. 8). Further, each rear cover 40r is formed such that an upper edge portion 41b thereof suitably covers a rear portion of the vehicle in a corresponding relationship to a lower end of a side face of the passenger's seat 11b.

Further, the side cover 40f extends such that an end portion 40a thereof on the front of the vehicle contacts with the front cover 40k and a lower end portion 40d thereof has a suitably curved shape such that a side face of the engine 20 is partly exposed therethrough. Meanwhile, an upper end portion 40c of the side cover 40f extends rearwardly from the end portion 40a such that it contacts with a lower end portion of the rider's seat 11a. On the further rear end side, a cutaway portion 40fb (refer to FIG. 6) conforming to the rear cover 40r is provided. The side cover 40f is suitably attached to the vehicle body frame 10 by an attaching portion 46, a plurality of engaging portions 45 on the inner side of the cover and so forth as shown in FIG. 6.

Further, in the present embodiment, a helmet holding wire 90 is exposed from a boundary portion between the rider's seat 11a and the passenger's seat 11b at the center in the vehicle widthwise direction. The helmet holding wire 90 is exposed without a gap from between the rider's seat 11a and the passenger's seat 11b in a state in which it is locked by a hook member (not shown) provided on the vehicle body frame 10.

In the intake system 30 of the present embodiment, the inlet 30e which is open to the right side of the vehicle body on the inner side of the vehicle body cover 40 is provided as shown in FIGS. 1 and 2. Further, in the present embodiment, a negative pressure formation section 50 is provided at a position on the right side rear cover 40r at a height H substantially equal to that of the inlet 30e in the vehicle heightwise direction and on the rear side of the vehicle. The negative pressure formation section 50 is disposed on the lower side on the rear side of the rider's seat 11a.

The negative pressure formation section 50 is structured such that it can generate, upon operation of the vehicle hereinafter described, a negative pressure effectively by a flow of air. The negative pressure formation section 50 is configured from a depressed portion 50a at which a vehicle body cover surface 40rs of the rear cover 40r is depressed inwardly of the vehicle body, and an opening 50b formed in the depressed portion 50a.

The shape of the depressed portion 50a of the negative pressure formation section 50 is described with reference to FIGS. 4 and 5.

Figure 4:
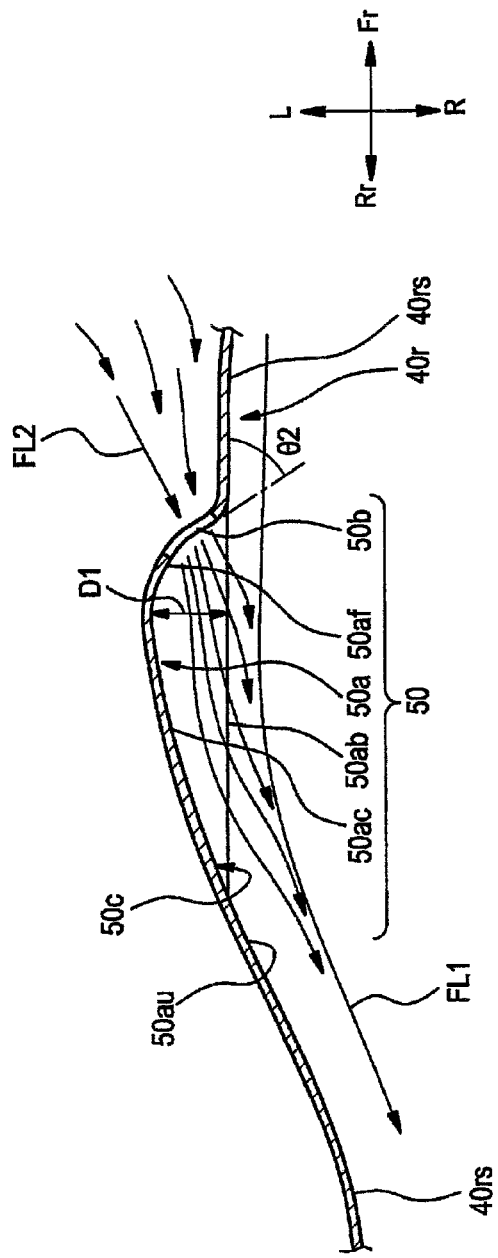
FIG. 4 is a sectional view taken along line B-B of FIG. 3(a)

The depressed portion 50a is shaped such that a depressed portion forward side wall 50af having an inclination angle θ2 by which the depression amount (depth) increases suddenly on the front side of the vehicle is provided, for example, as shown in FIG. 4. The depressed portion forward side wall 50af continues to a depressed portion bottom face 50ac which has a moderately curved face extending rearwardly from the depressed portion forward side wall 50af. Further, the depressed portion 50a is formed, within a range from the depressed portion bottom face 50ac to a depressed portion outer side portion 50au behind the depressed portion 50a, as a streamline-shaped curved line 50c which is continuous and moderate.

Further, the depressed portion 50a is configured such that upper and lower side wall portions 50ab thereof extend substantially in the vehicle forward and rearward direction and substantially in parallel to each other (refer to FIG. 3). The upper and lower side wall portions 50ab are formed in an upwardly and downwardly opposing relationship to each other in a state in which a width LW1 of the depressed portion 50a is kept from the front to the rear of the vehicle as shown in FIG. 5. Further, the depressed portion 50a is formed such that the depth D1 thereof gradually decreases toward the rear side from the front side of the vehicle as shown in FIG. 4.

The opening 50b in the present embodiment is described with reference to FIGS. 3, 4 and 5.

In the present embodiment, the opening 50b is formed in an elongated shape like a slit, and the direction of the slit is inclined, for example, in the forward and backward direction of the vehicle. In particular, as shown in FIG. 3, the opening 50b is inclined suitably by an angle θ1 such that an upper end thereof is positioned on the vehicle rear side with respect to a lower end thereof. The opening 50b has a shape of a comparatively small width on the vehicle front lower side with respect to the rear cover 40r and is directed in such a manner as to extend along the shape (refer to FIG. 1) inclined along the forward and backward direction of the vehicle.

Figure 5:
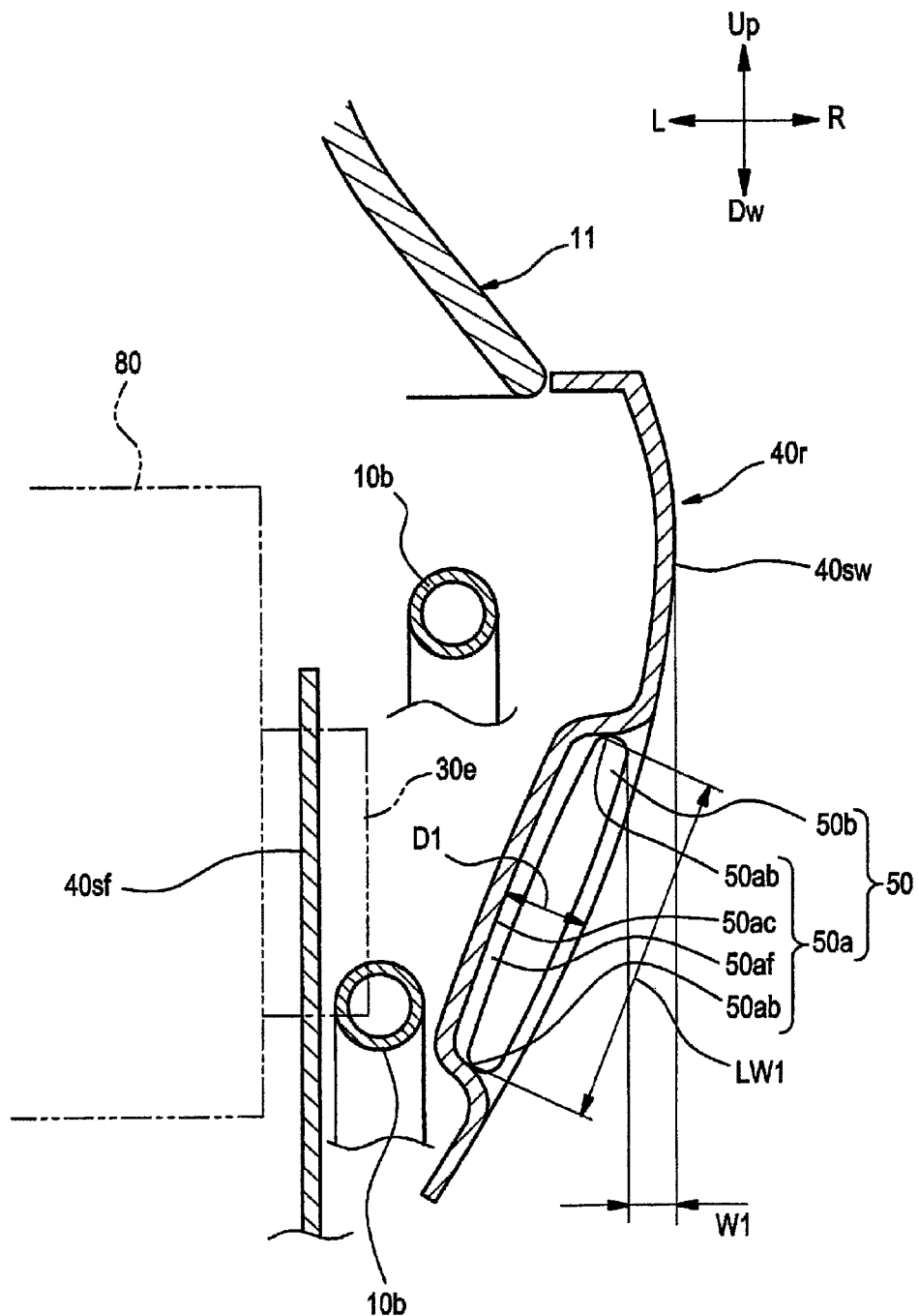
FIG. 5 is a sectional view taken along line C-C of FIG. 1 showing a negative pressure formation section and peripheral components of the motorcycle shown in FIG. 1.

Further, in the present embodiment, the opening 50b is provided such that the formation position thereof is the depressed portion forward side wall 50af on the vehicle front side of the depressed portion 50a as shown in FIG. 5. Further, the opening 50b is formed with a length substantially equal to the length of the depressed portion forward side wall 50af. Accordingly, the opening 50b is formed over the substantially overall width LW1 in the vehicle height direction of the depressed portion 50a.

In the following, working of the negative pressure formation section 50 upon operation of the vehicle is described.

First, the rider would be seated on the rider's seat 11a and place the feet thereof on a pair of left and right steppers 19 (refer to FIG. 2) such that the right foot can carry out an operation of a foot brake 19b and the left foot can carry out an operation of a gear changer lever 19g. Accordingly, the legs HL of the rider extend from the rider's seat 11a such that the knees thereof are positioned on the lower side of the fuel tank 16 and to the upper side of the engine 20 as shown in FIG. 1 such that the vehicle travels in a state in which a knee grip is possible.

In the present embodiment, since the depressed portion 50a in which the vehicle body cover surface 40rs is depressed inwardly of the vehicle body, an air flow FL1 is generated as seen in FIG. 4 upon operation of the vehicle. Consequently, the inside of the depressed portion 50a is placed into a negative pressure state. Since the opening 50b is formed in the depressed portion 50a, a suction flow FL2 which sucks up air in the inside of the vehicle body cover 40 (refer to FIG. 4) is generated by the generated negative pressure. Accordingly, the air in the proximity of the inlet 30e is compulsorily sucked out and is fluidized. As a result, as an intake air flow FL3 (refer to FIG. 8) to be sucked into the inlet 30e, the air of a comparatively low temperature introduced from the outside of the vehicle body cover 40 other than air warmed by the engine 20 can be sucked. Consequently, the engine output power can be improved.

Further, in the present embodiment, since the negative pressure formation section 50 is disposed on the lower side of a rear portion of the rider's seat 11a of the seat 11, the negative pressure formation section 50 is positioned in a spaced relationship by a great distance from the position at which the legs HL of the rider are placed. Therefore, current of the air flow FL1 which passes the vehicle body cover surface 40rs can be prevented from being obstructed by the legs HL. Accordingly, generation of a negative pressure by the air flow FL1 can be ensured to assure the suction force of the suction flow FL2. Also it is possible to prevent suction air of a high temperature from hitting on the legs HL of the rider.

The negative pressure formation section 50 in the present embodiment is configured in a streamline-shaped curved line 50c which moderately continues from the depressed portion bottom face 50ac of the depressed portion 50a toward the depressed portion outer side portion 50au on the vehicle rear side in the vehicle forward and rearward direction as shown in FIG. 4. Therefore, the suction flow FL2 sucked from the inner side of the vehicle body cover 40 smoothly flows when it flows from within the depressed portion 50a to the depressed portion outer side portion 50au on the vehicle rear side, and can merge into the air flow FL1. Consequently, a smooth air flow can be produced.

Further, in the present embodiment, since the depressed portion 50a is configured such that the upper and lower side wall portions 50ab substantially extend along the vehicle forward and backward direction, air in the depressed portion 50a can be guided so as to flow along the air flow FL1. This can contribute to production of a smooth air flow.

Further, in the present embodiment, since the opening 50b is configured like a slit, admission of a foreign article through the opening 50b into the inside of the vehicle body cover 40 can be made difficult.

Further, in the present embodiment, since the opening 50b is provided on the depressed portion forward side wall 50af of the depressed portion 50a, the opening direction of the opening 50b can be set to the vehicle rear direction. Consequently, the suction force can be directed along the direction of the inlet and effective suction can be achieved. Further, since the opening 50b is provided in the depressed portion forward side wall 50af, the opening width of the opening 50b in the forward and backward direction as viewed from the lateral direction of the vehicle body can be made small and the foreign article admission prohibiting effect can be raised. Further, the opening 50b can be formed so as not to have a prominent appearance.

Further, in the present embodiment, the opening 50b is formed such that it opens over the substantially overall width LW1 (refer to FIG. 5) of the depressed portion 50a in the vehicle heightwise direction. Therefore, the depressed portion 50a can be utilized to the utmost as a negative pressure formation width over the substantially overall width thereof, and effective suction can be achieved.

Further, in the present embodiment, as shown in FIG. 5, the seat rail 10b is disposed on the inner side on which the negative pressure formation section 50 is formed, and a fender 40sf is provided inside the seat rail 10b on the front upper side with respect to the rear wheel RW. An electrical component 80 such as, for example, a battery is disposed inside the fender 40sf.

In this manner, in the present embodiment, the opening 50b of the negative pressure formation section 50 is disposed on the outer side of the fender 40sf on the side of the vehicle.

Consequently, the admission of water, a foreign article or the like into the inside of the vehicle body through the opening 50b can be prevented by the fender 40sf, and the electrical component 80 can be protected while an air sucking effect is achieved.

Further, in the present embodiment, as shown in FIG. 5, an opening upper outer wall face 40sw of the rear cover 40r on the upper side of the opening 50b projects to the vehicle width outer side through the opening 50b. In particular, an outermost portion of the opening 50b is positioned on the inner side in the vehicle widthwise direction by a predetermined dimension W1 from the opening upper outer wall face 40sw of the rear cover 40r.

In this manner, in the present embodiment, since the opening upper outer wall face 40sw on the upper side of the opening 50b projects to the outer side of the vehicle width through the opening 50b, invasion of rainwater and so forth through the opening 50b can be prevented.

Further, in the present embodiment, a structure for fluidizing an air flow is provided also on the side cover 40f which is the vehicle body cover 40. In particular, as shown in FIG. 7, an intake air guide portion 40fg for guiding a flow of air upon operation of the vehicle is provided on the side cover 40f on the vehicle front side with respect to the inlet 30e. The intake air guide portion 40fg is configured in a substantially L shape which extends from a front upper point 40gm to a rear point 40ge and further to a front lower point 40gn as viewed from a side of the vehicle. In particular, as shown in FIG. 6(b), the intake air guide portion 40fg is shaped such that the heightwise dimension thereof in the vehicle upward and downward direction decreases from the right side toward the left side in the figure (WD1>WD2>WD3).

Figures 6A, 6B:
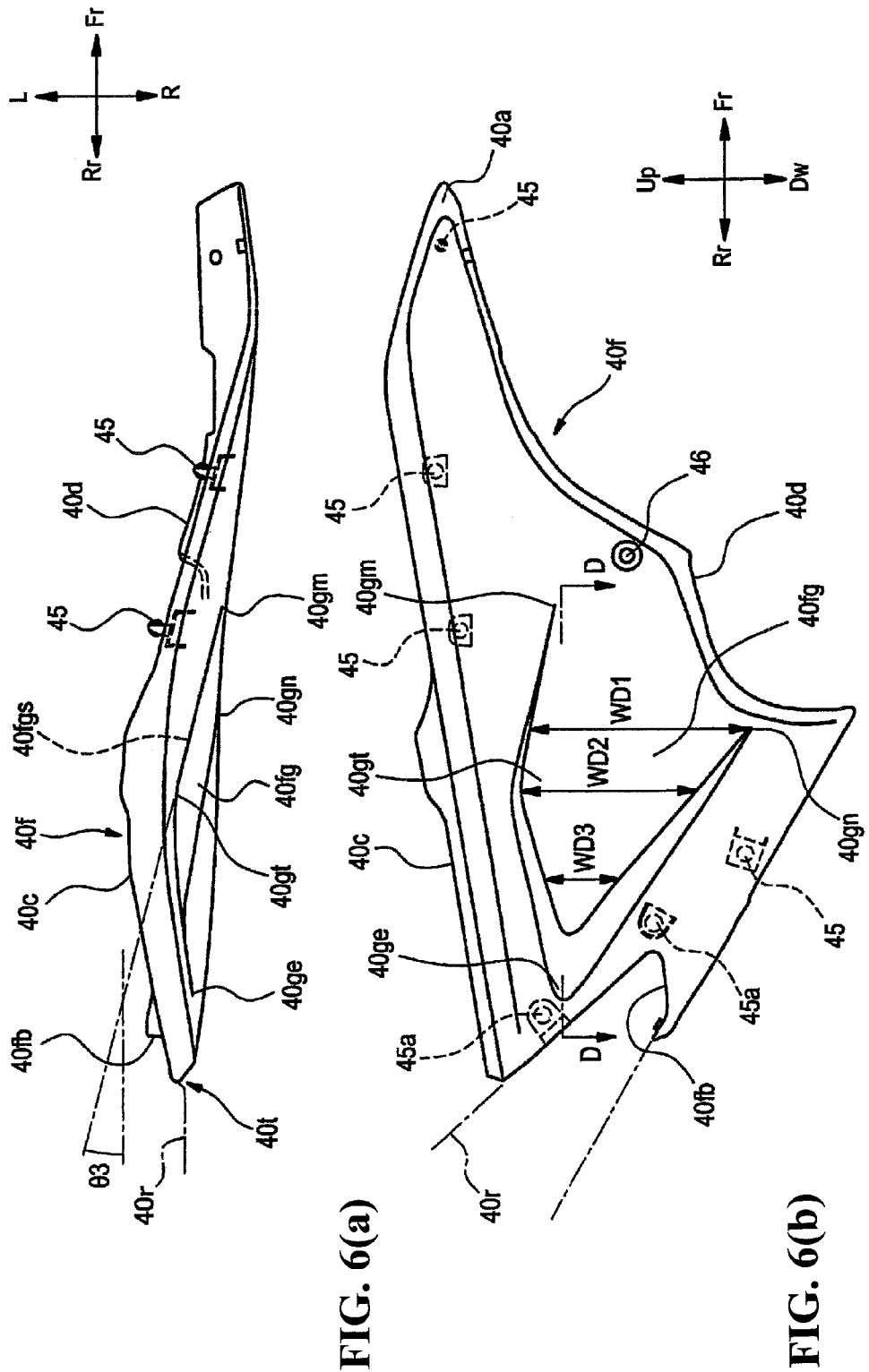
FIGS. 6(a) and 6(b) are a plan view and a side elevational view showing a side cover of the motorcycle shown in FIG. 1. More particularly.
Figure 7:
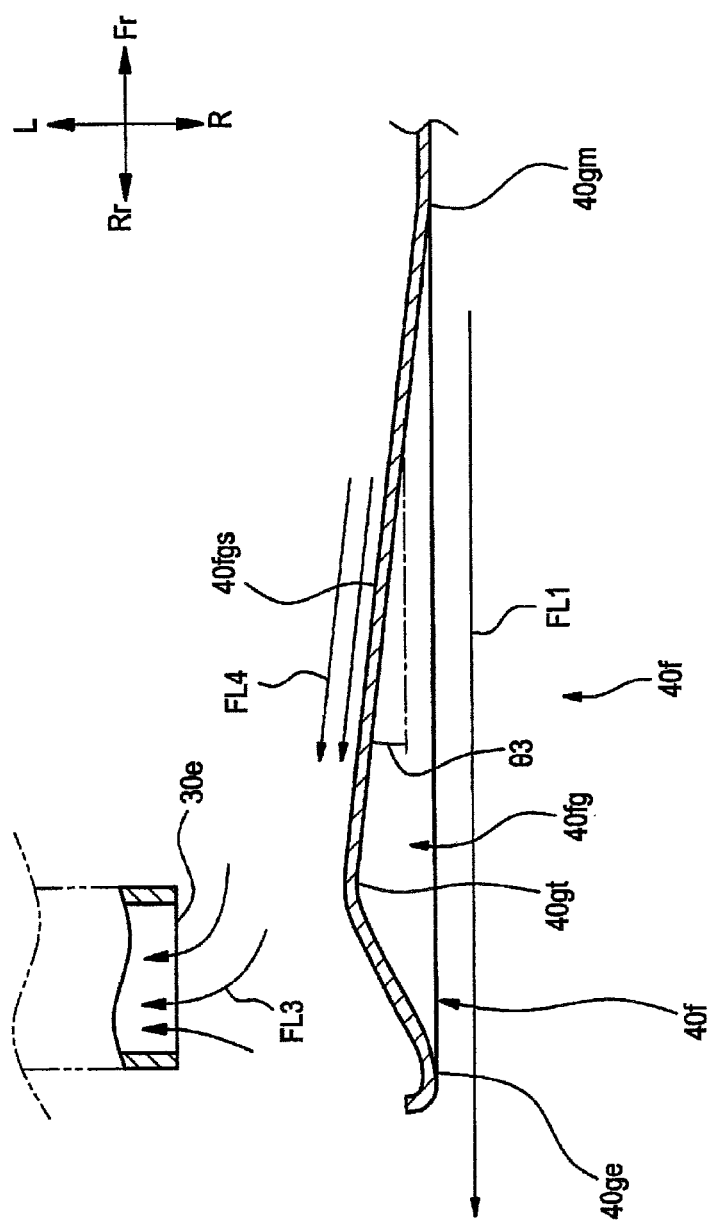
FIG. 7 is a sectional view taken along line D-D of FIG. 6(a)
Figure 8:
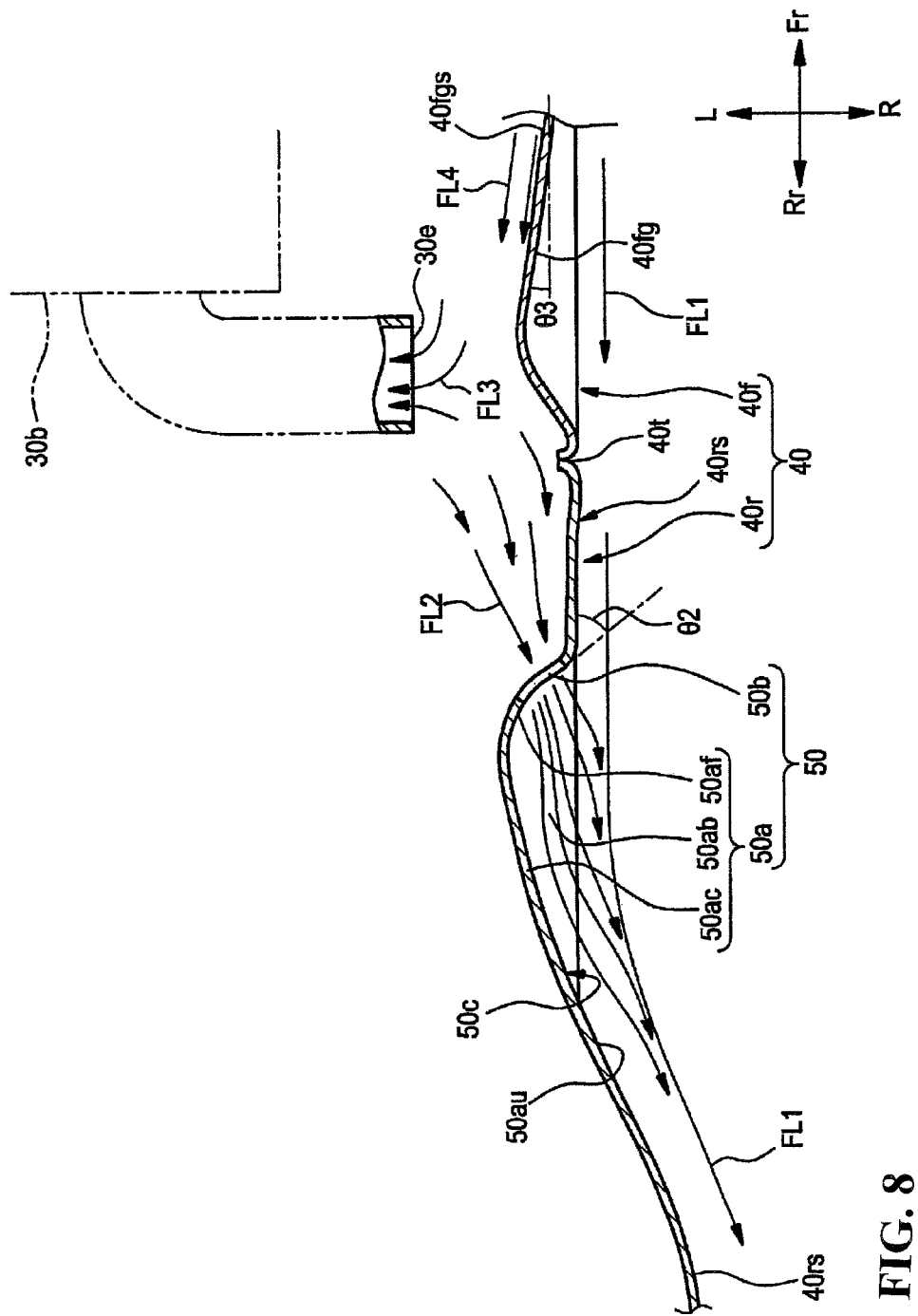
FIG. 8 is a partial schematic sectional view taken along line A-A of FIG. 1 illustrating a disposition state of the negative pressure formation section, an inlet and an intake air guide portion of the motorcycle shown in FIG. 1 as viewed from above the vehicle.

Further, the intake air guide portion 40fg is configured such that the projecting height to the inner side of the vehicle body gradually increases within a range from the front upper point 40gm and the front lower point 40gn on the front side shown in FIGS. 6(a) and 6(b) to a middle stage point 40gt on the middle stage side. Further, the intake air guide portion 40fg is configured such that, from the middle stage point 40gt to the rear point 40ge on the rear side, the projecting height thereof gradually decreases. In other words, as shown in FIG. 7, the intake air guide portion 40fg has an intake air guide face 40fgs which projects to the vehicle body inner side in the forward and backward direction of the vehicle toward the inlet 30e side and has an inclination of an inclination angle θ3. Therefore, an in-cover air flow FL4 on the inner side of the vehicle body cover 40 can be guided to the inlet 30e side.

It is to be noted that, also on the side cover 40f on the left side not shown, a similar intake air guide portion 40fg is formed.

Where the intake air guide portion 40fg which projects to the inner side of the vehicle body on the vehicle front side with respect to the inlet 30e and guides the in-cover air flow FL4 on the inner side of the vehicle body cover 40 toward the inlet 30e side is provided on the vehicle body cover 40 in this manner, fresh air can be fed compulsorily toward the inlet 30e. Consequently, air from the front of the vehicle having a comparatively low temperature other than air warmed by the engine 20 can be supplied by a greater amount to the inlet 30e.

Further, in the present embodiment, the opening 50b, inlet 30e and intake air guide portion 40fg are disposed at a substantially same height in the vehicle upward and downward direction as shown in FIG. 1.

Since the opening 50b, inlet 30e and intake air guide portion 40fg are disposed at a substantially equal height in the vehicle upward and downward direction in this manner, an air feeding action to the inlet 30e by the in-cover air flow FL4 by the intake air guide portion 40fg on the front side with respect to the inlet 30e and an air sucking action to suck out air in the proximity of the inlet 30e through the opening 50b on the rear side of the inlet 30e can be carried out simultaneously. As a result, air in the proximity of the inlet 30e can be more effectively allowed to flow thereby to discharge air confined in the vehicle body cover 40 to the outside of the vehicle body cover 40. Consequently, the air of a low temperature can be sucked through the inlet 30e.

In the embodiment of the present invention described hereinabove, the opening 50b of the negative pressure formation section 50 is entirely provided in the depressed portion forward side wall 50af of the depressed portion 50a. However, the opening 50b of the negative pressure formation section 50 is not limited to that of such a structure as just described, but may be configured such that, for example, the opening 50b is provided on the depressed portion bottom face 50ac. Further, in the embodiment described hereinabove, the opening 50b is shaped as a slit. However, the opening 50b may be shaped not specifically as a slit but may be shaped in various shapes such as, for example, a circular shape, a semicircular shape, a crescent shape or an elliptical shape.

Further, in regard to the shape of the depth of the depressed portion 50a in the embodiment described above, the vehicle front side of the horizontal section thereof becomes deep suddenly while the vehicle rear side has a moderate slope. However, the shape of the depressed portion 50a is not limited specifically to the configuration just described, but may be configured otherwise such that, for example, the same inclined face may be provided on both of the front and rear sides of the vehicle. It's not specifically limited. Further, in the present invention, the upper and lower side wall portions 50ab of the depressed portion 50a may not extend in parallel to each other at upper and lower positions or may not exhibit straight lines as viewed from a side of the vehicle.

Further, while, in the embodiment described hereinabove, the negative pressure formation section 50 is provided on the right side vehicle body cover 40 positioned closely to the inlet 30e, it may otherwise be provided on the left side vehicle body cover 40.

Further, while the embodiment described above is directed to a motorcycle, the present invention can be applied to various types of saddle type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. An intake structure for a saddle vehicle comprising:
an intake system disposed behind an engine supported on a vehicle body frame;
a vehicle body cover for covering at least a side of the intake system;
an inlet, open to a side of a vehicle body on the inner side of the vehicle body cover, said inlet being in communication with the intake system; and
a negative pressure formation section configured from a depressed portion wherein a vehicle body cover surface is depressed to the inner side of the vehicle body and an opening positioned in the depressed portion, said opening being provided at a position of the vehicle body cover at a substantially equal height to that of the inlet and on the rear side of the vehicle.

2. The intake structure for a saddle vehicle according to claim 1, wherein the negative pressure formation section is disposed on the lower side of a rear portion of a rider's seat of a seat.

3. The intake structure for a saddle vehicle according to claim 1, wherein upper and lower side wall portions of the depressed portion are formed to extend substantially along a forward and rearward direction of the vehicle.

4. The intake structure for a saddle vehicle according to claim 2, wherein upper and lower side wall portions of the depressed portion are formed so as to extend substantially along a forward and rearward direction of the vehicle.

5. The intake structure for a saddle vehicle according to claim 1, wherein the opening is a slit inclined in a forward and rearward direction of the vehicle body.

6. The intake structure for a saddle vehicle according to claim 2, wherein the opening is a slit inclined in a forward and rearward direction of the vehicle body.

7. The intake structure for a saddle vehicle according to claim 3, wherein the opening is a slit inclined in a forward and rearward direction of the vehicle body.

8. The intake structure for a saddle vehicle according to claim 1, wherein the opening is provided in a depressed portion forward side wall on the front side of the vehicle with respect to the depressed portion.

9. The intake structure for a saddle vehicle according to claim 2, wherein the opening is provided in a depressed portion forward side wall on the front side of the vehicle with respect to the depressed portion.

10. The intake structure for a saddle vehicle according to claim 1, wherein the opening is provided over a substantially overall width of the depressed portion in a heightwise direction of the vehicle.

11. The intake structure for a saddle vehicle according to claim 2, wherein the opening is provided over a substantially overall width of the depressed portion in a heightwise direction of the vehicle.

12. The intake structure for a saddle vehicle according to claim 1, wherein a depressed portion bottom face of the depressed portion is formed in a moderate streamline-shaped curved line continuing to a depressed portion outer side portion outside the depressed portion toward the rear of the vehicle.

13. The intake structure for a saddle vehicle according to claim 2, wherein a depressed portion bottom face of the depressed portion is formed in a moderate streamline-shaped curved line continuing to a depressed portion outer side portion outside the depressed portion toward the rear of the vehicle.

14. The intake structure for a saddle vehicle according to claim 1, wherein an opening upper outer wall face positioned on the upper side of the opening is provided on the vehicle body cover to project to the outer side in the vehicle widthwise direction through the opening.

15. The intake structure for a saddle vehicle according to claim 1, wherein an intake air guide portion projects to the inner side of the vehicle body on the front side of the vehicle with respect to the inlet and guides an in-cover air flow on the inner side of the vehicle body cover to the inlet side provided on the vehicle body cover.

16. The intake structure for a saddle vehicle according to claim 15, wherein the opening, inlet and intake air guide portion are disposed at a substantially equal height in an upward and downward direction of the vehicle.

17. The intake structure for a saddle vehicle according to claim 1, wherein a fender is provided on the inner side of the opening in the widthwise direction of the vehicle.

18. An intake structure for a saddle vehicle comprising:
an intake system disposed behind an engine;
a vehicle body cover for covering at least a side of the intake system;
an inlet, open to a side of a vehicle body on an inner side of the vehicle body cover, said inlet being in communication with the intake system; and
a negative pressure formation section configured from a depressed portion wherein a vehicle body cover surface is depressed to the inner side of the vehicle body and a slit opening positioned in the depressed portion, said slit opening being provided at a position of the vehicle body cover at a substantially equal height to that of the inlet and on the rear side of the vehicle and said slit opening being inclined in a forward and rearward direction of the vehicle.

19. The intake structure for a saddle vehicle according to claim 18, wherein the negative pressure formation section is disposed on the lower side of a rear portion of a rider's seat of a seat.

20. The intake structure for a saddle vehicle according to claim 18, wherein upper and lower side wall portions of the depressed portion are formed to extend substantially along a forward and rearward direction of the vehicle.

* * * * *